No. 825,933. PATENTED JULY 17, 1906.
J. R. PEIRCE.
MOLDING MACHINE.
APPLICATION FILED JUNE 16, 1905.
5 SHEETS—SHEET 2.
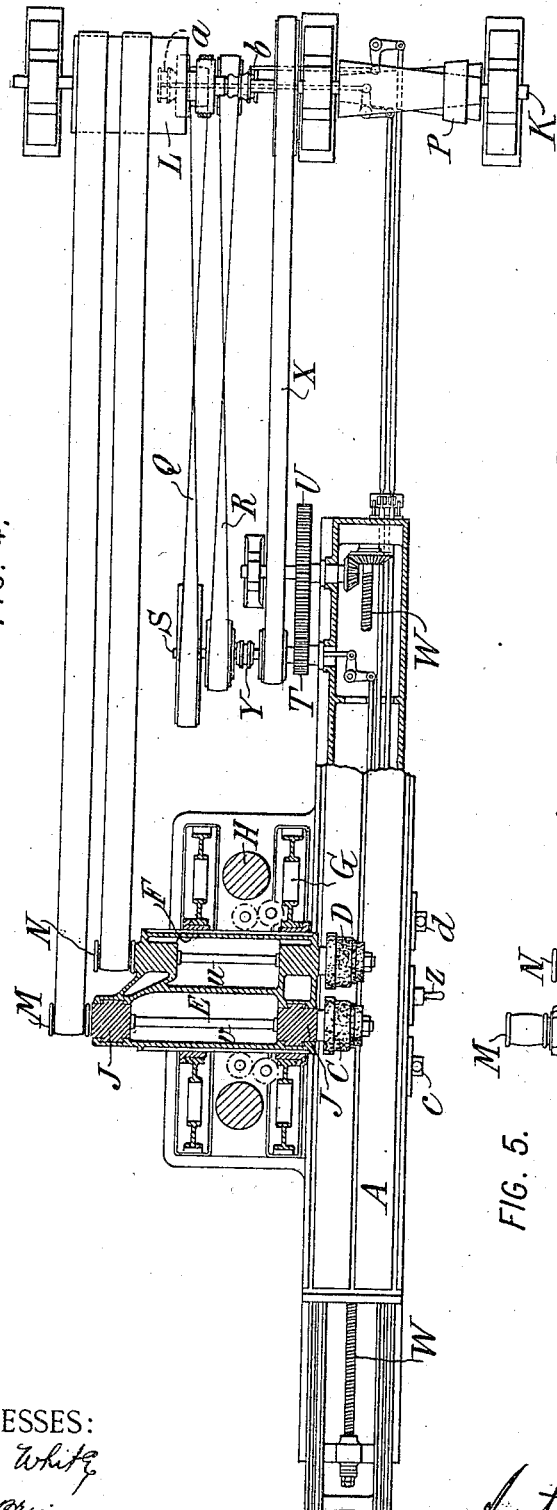
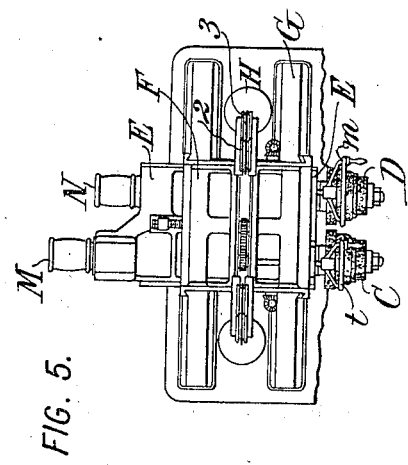
WITNESSES:
INVENTOR:
John Royden Peirce,
By Attorneys, No. 825,933.

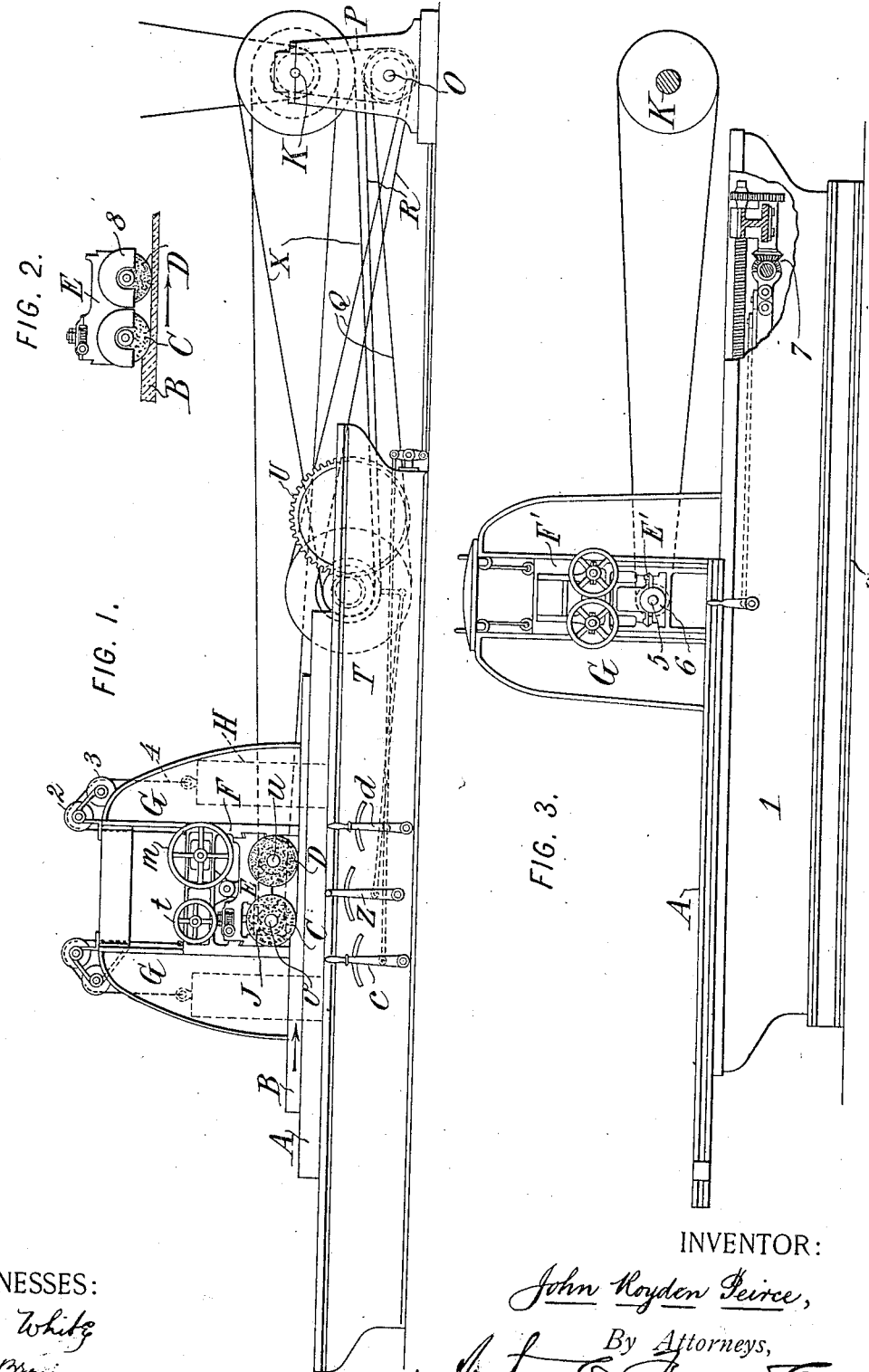

PATENTED JULY 17, 1906.

J. R. PEIRCE.
MOLDING MACHINE.
APPLICATION FILED JUNE 16, 1905.

5 SHEETS—SHEET 3.

WITNESSES:

INVENTOR:
John Rayden Peirce,
By Attorneys,

No. 825,933. PATENTED JULY 17, 1906.
J. R. PEIRCE.
MOLDING MACHINE.
APPLICATION FILED JUNE 16, 1905.
5 SHEETS—SHEET 4.

WITNESSES:

INVENTOR:
John Royden Peirce,
By Attorneys,

No. 825,933. PATENTED JULY 17, 1906.
J. R. PEIRCE.
MOLDING MACHINE.
APPLICATION FILED JUNE 16, 1905.

5 SHEETS—SHEET 5.

WITNESSES:
Fred White,
Rene Bruine

INVENTOR:
John Royden Peirce,
By Attorneys,
Arthur C. Fraser & Co

UNITED STATES PATENT OFFICE.

JOHN ROYDEN PEIRCE, OF NEW YORK, N. Y.

MOLDING-MACHINE.

No. 825,933.  Specification of Letters Patent.  Patented July 17, 1906.

Application filed June 16, 1905. Serial No. 265,593.

*To all whom it may concern:*

Be it known that I, JOHN ROYDEN PEIRCE, a citizen of the United States, residing in the borough of Manhattan, city, county, and State of New York, have invented certain new and useful Improvements in Molding-Machines, of which the following is a specification.

The improved machine of this invention is designed for cutting moldings in stone—such for example, as the marble moldings used in door-frames or similar situations—and aims to provide a machine whereby the work can be done very rapidly and very perfectly.

In my applications for Patent Serial Nos. 227,842 and 245,304, filed, respectively, October 10, 1904, and February 11, 1905, I have described the use of a cutting-wheel of agglomerated coarse crystalline very hard material, such as coarse carborundum, by means of which the stone can be cut to the desired pattern with great rapidity and with a very clean, sharp, and smooth effect and without the heating of the stone which occurs with emery or carborundum wheels of commercial sizes or with steel tools operating at desirable speeds.

In my application Serial No. 245,304, filed February 11, 1905, I have described the use of two simultaneously-operating wheels, a coarse roughing-out wheel, and a finer molding-wheel, respectively, for obtaining the same result more expeditiously.

My present application is, in part, a division of the aforesaid applications and describes certain features of the invention which adapt it especially to the cutting of moldings in marble and other stone by the use of rotating carborundum-wheels and which is also capable of use in connection with cutters of other materials.

The accompanying drawings illustrate machines embodying the invention.

Figure 7:
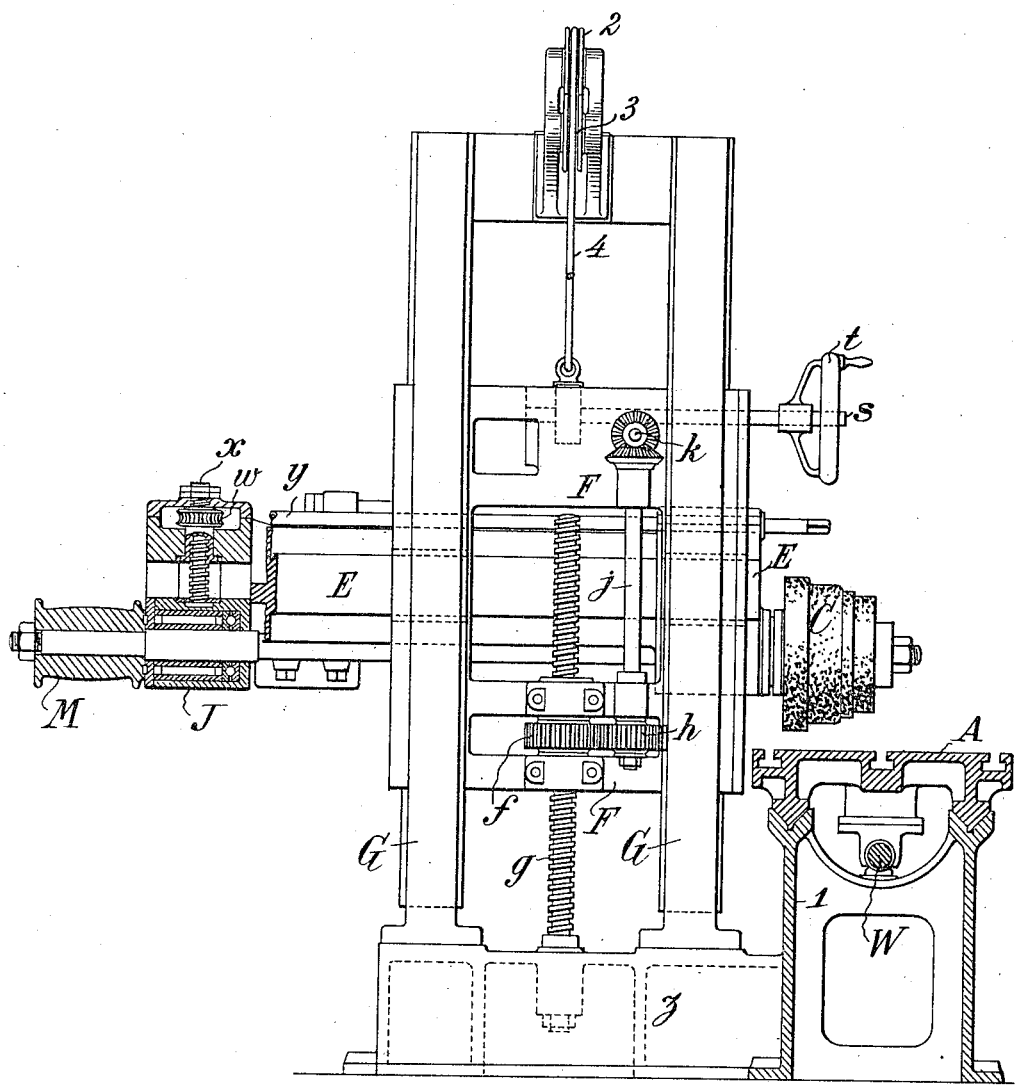
Figure 8:
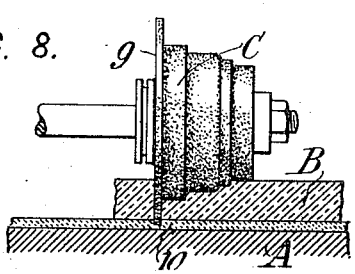
Figures 9, 12:
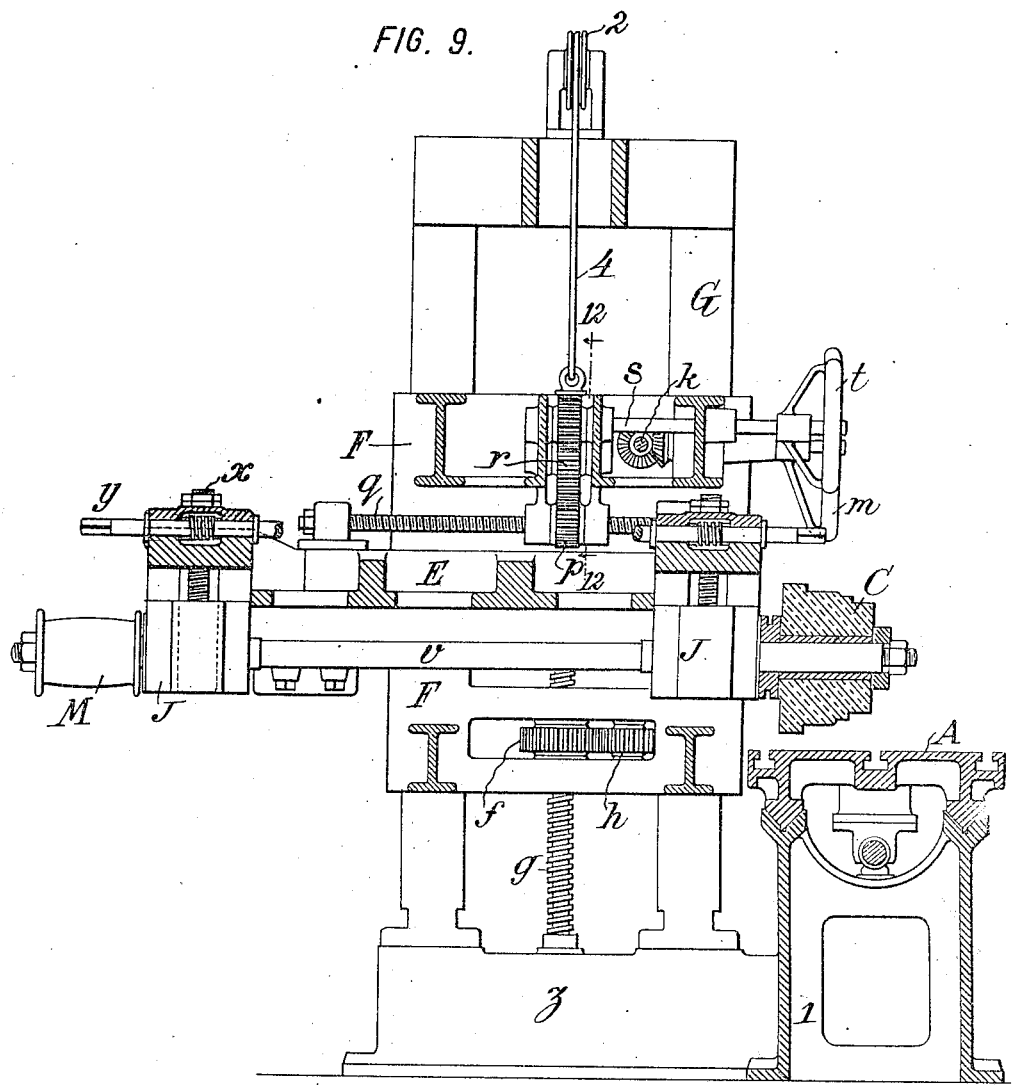
Figure 10:
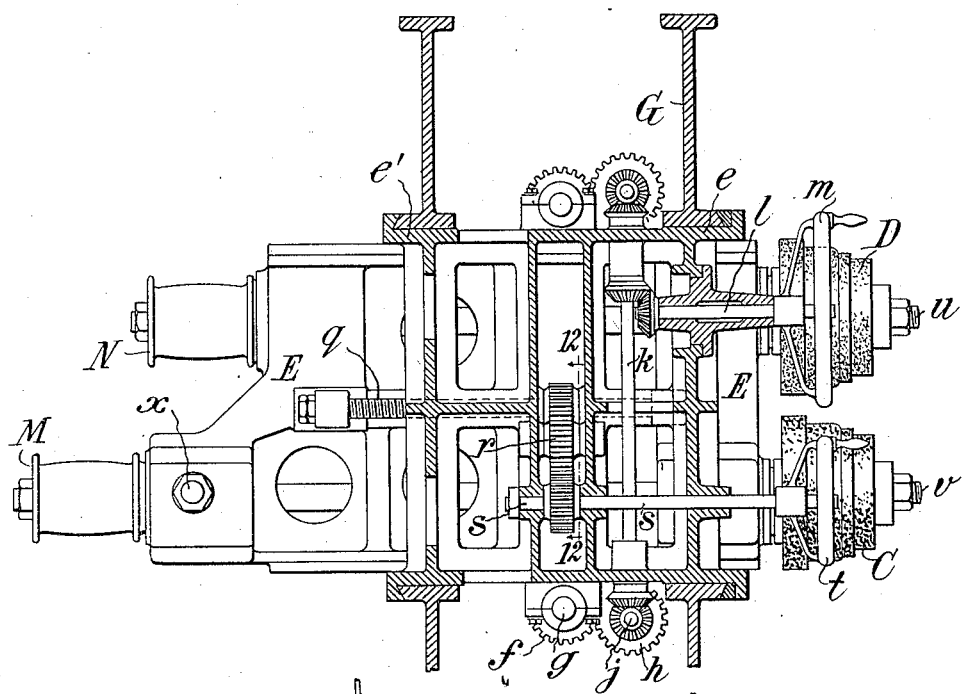
Figure 11:
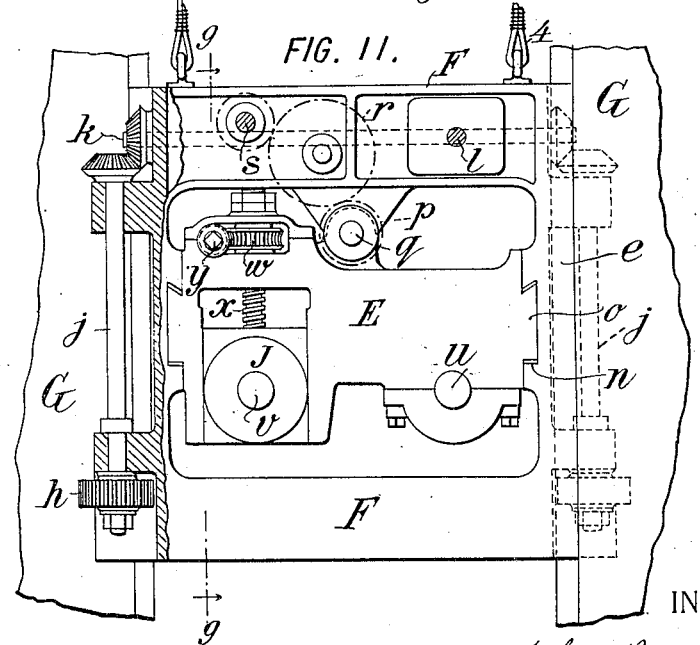

Figure 1 is a front elevation of a two-wheel machine. Fig. 2 is a detail showing the mounting of the wheels, slightly modified. Fig. 3 is an elevation, partly in section, of a single-wheel machine, the wheel being omitted. Fig. 4 is a horizontal section of the machine of Fig. 1 at approximately the level of the molding-wheel shafts. Fig. 5 is a plan of the portion of the machine carrying the cutting-wheels, showing the relative positions of the principal parts and omitting details. Fig. 6 is an end elevation of the machine, showing the driving-shaft and adjacent parts. Fig. 7 is a side elevation, partly in section, the bed appearing in transverse section. Fig. 8 is a side view of a cutting-wheel of a modified shape and function. Fig. 9 is a vertical section approximately through the line 9 9, Fig. 11. Fig. 10 is a horizontal section approximately at the plane of the adjusting-shafts. Fig. 11 is a portion of Fig. 1 enlarged for the sake of clearness and omitting the cutting-wheels. Fig. 12 is a section on the line 12 12 of Figs. 9 and 10.

Referring to the embodiment illustrated in the drawings, A is a longitudinally-moving bed similar to that usually employed in planers. The work, consisting of a slab B, of stone, is clamped on the bed and is fed therewith in the direction of the arrow, Fig. 1. The stone passes in succession under the roughing-out wheel C and the molding-wheel D, the former being preferably of the coarsest grade of carborundum and the latter of a finer grade of the same material. The two wheels or their shafts are mounted in a carriage E, which may be adjusted laterally of the table, being arranged in slideways in a vertically-adjustable frame F, the latter in turn being arranged in slideways in the two standards G and being counterbalanced by means of weights H. The relative elevations of the two wheels C and D may be adjusted, the shaft of the wheel C being mounted for this purpose in bearing-blocks J at its opposite ends and which are vertically adjustable in the carriage E.

The molding-wheel D will have the contour which it is desired to have in the work. The roughing-out wheel C may be of the same contour or roughly approximating the same and lying within the line of the molding-wheel, so as to cut more or less closely to the finished pattern.

The use of two separate wheels to cut the molding has certain great advantages over the use of a single wheel, especially for large moldings. There are certain advantages in making a cutting-wheel soft and other advantages in making it hard. Within practical limits the softer wheel cuts the more quickly because it does not glaze its own face. By reason of its softness it renews its own cutting-face very rapidly so as to be practically self-sharpening. These advantages are fully secured by making the molding-wheel comparatively soft, thus enabling it to cut a great quantity of material and to cut very rapidly. The fact that it cuts a rather rough line and that it does not preserve its shape perfectly are not material in a roughing-out wheel. Therefore for this wheel I may use the coarsest carborundum—four-grit or four-mesh, for example—and make it as soft as practicable. I then arrange it so as to cut out nearly the entire molding, leaving only one-sixteenth to one-eighth of an inch of material for the molding-wheel to cut away. The molding-wheel having so little material to cut away can therefore be made very hard, so that it preserves its edges sharp and produces a correspondingly sharp molding. The small amount of material to be cut has practically no glazing effect on the molding-wheel. This wheel may, in fact, be made so fine as to do away with a large part of the hand rubbing and finishing now ordinarily practiced.

The use of two wheels is also very economical in power, the roughing-out wheel being able to do more than twice the work of the molding-wheel and requiring much less power, as evidenced by the coarseness of the material removed. The "dust" which flies off from the roughing-out wheel is very much coarser than the practically-pulverized stone which comes from finer wheels. The roughing-out wheel seems to have more nearly a chipping action than a pulverizing action.

By extensive experiments I have found that for the greatest efficiency the speed of the cutting-wheels should be very high, and the feed of the marble comparatively slow, depending on the depth or quantity of marble cut out. For example, I have built a machine having a surface speed of about five thousand five hundred feet per minute for the cutting-wheels and having a speed of from three to thirty-six inches per minute for the marble. The mechanism for obtaining these speeds is illustrated in Figs. 1, 4, and 6. A driving-shaft K is provided with a drum L, carrying two belts running to the pulleys M and N, respectively, of the roughing-out and molding wheels. By driving the two cutting-wheels separately a variation in the speed of revolution is made possible. The feed of the marble is controlled from a lower shaft O, which is driven from the upper shaft K by means of a pair of cone-pulleys and a belt P. The shaft O carries a pair of feed-pulleys which drive, respectively, a slow feed-belt Q and a fast feed-belt R, which drive pulleys adapted to be clutched to a shaft S, which is connected by gears T, U, and V to the threaded shaft W, which moves the bed A forward and back according to the direction of rotation of the shaft in the usual manner. A quick-return belt X is provided driven, preferably, from a pulley on the shaft K and communicating motion to a pulley adapted to be clutched on the shaft S. The clutch Y on the shaft S is controlled by a lever Z, and the clutches $a$ and $b$ on the shaft O are controlled by levers $c$ and $d$, respectively. By these arrangements and a suitable belt-shifter for the belt P on the cone-pulleys in order to make fine variations in speed the feed may be nicely adjusted to suit the hardness of the marble and the depth of cut. Thus the operator avoids undue strain on the wheels while securing the maximum output of the machine.

The vertically-adjustable frame, which I designate as a whole by the letter F, is provided with suitable slides $e$ $e'$, engaging, respectively, suitable slideways at the front and rear of the standards G. It is raised and lowered by rotating nuts $f$, held between bearings at the sides of the frame and threaded upon screw-shafts $g$, solidly mounted at their lower ends in the base of the standards. The nuts $f$ are rotated by means of pinions $h$ at the lower ends of shafts $j$, mounted upon the sides of the frame, the shafts $j$ being rotated by means of gearing connecting them to a common horizontal shaft $k$, which in turn is driven from a shaft $l$, projecting through the face of the frame and provided with a handwheel $m$.

The frame F is substantially a box provided with suitable internal partitions and stiffening-ribs and bosses to carry the several shafts required. It is provided, furthermore, with suitable internal guiding-grooves $n$, into which project tongues $o$ of the carriage, which I designate as a whole by the letter E. These tongues and grooves guide the carriage in its back-and-forth adjustment transversely of the feed of the marble. The movement is effected by the rotation of a nut $p$, Fig. 12, which is firmly held between two central partitions of the frame F and which is threaded upon a screw-shaft $q$, firmly connected at opposite ends to the carriage E. The nut $p$ is rotated by means of an intermediate pinion $r$ from the shaft $s$, which projects through to the front of the machine and is provided with a hand-wheel $t$.

The carriage E is shown best in Figs. 7 and 9 to 11. The shaft $u$ of the molding-wheel D is mounted in antifriction-bearings in a shorter portion of the carriage, while the shaft $v$ of the roughing-out wheel C is mounted in the vertically-adjustable bearing-blocks J, one of which is provided at each end of a longer portion of the carriage.

The adjustment of the bearing-blocks J is effected by means of nuts $w$, supported upon end portions of the carriage and threaded upon screw-shafts $x$, connected to the bearing-blocks J, the nuts $w$ being operated from a worm-shaft $y$ projecting through to the front and rear of the machine, where it may be provided with squared ends for engagement by a wrench.

The four standards G are mounted on a base $z$, which is made integral with or otherwise connected directly to the supporting-base 1 of the feed-table A, thus securing the great degree of rigidity which is essential to the nicest work. The standards are also connected at the top and carry suitable guide-pulleys 2 and 3 for the steel ropes 4, which connect the frame F with its counterweights H.

The term "molding" is used here in a generic sense to apply to the operation of roughing out the stone as well as reducing it to the finished form, and also to include the cutting of grooves or rabbets or bevels, the fluting of columns, and all similar operations.

With this improved machine, the stone being clamped upon the bed, the cutting-wheel can be adjusted wth the greatest accuracy in both the lateral and the vertical directions, so that when the cutting-wheel is started up and the stone is given the necessary longitudinal motion the molding can be cut very accurately as well as rapidly. In addition, where two wheels are used in a single machine, the relative heights of these two wheels may be perfectly adjusted, so that each will cut an amount proportioned to its capacity.

Instead of using the machine described with two cutters operating simultaneously the machine of Fig. 3 may be used, having a single cutter-shaft 5, upon which may be mounted the cutting-wheels, first a roughing-out wheel and afterward a molding-wheel, the complete operation requiring in this case two passages of the stone through the machine. Except for the provision for vertically adjusting one shaft relatively to the other the adjustments and operations in this machine are identical with those in the machine of Fig. 1. A reversing-gear of well-known type for operating the bed is illustrated somewhat diagrammatically at 7. The carriage is designated E' and the vertically-adjustable frame F'.

The roughing-out or molding wheel, or both wheels, may be advantageously provided with a hood or hoods 8, Fig. 2, which may be fastened to the front of the carriage and extend over the tops and sides of the wheels. Through these hoods a jet of water may be introduced and the water retained upon the wheel in the manner set forth in detail in my application for patent filed December 14, 1904, Serial No. 236,778, or other methods of applying a cooling-jet may be used and will be specially useful in connection with the molding-wheel, which should be much finer than the roughing-out wheel.

An important application of the machine is illustrated in Fig. 8, by means of which the slab of marble may be divided and a molding formed at the same time on the new edge. For this purpose the cutter, which may be a coarse wheel C, is provided with a portion 9 of larger diameter and arranged at such a level as to cut through the slab B. The main or molding portion of the wheel forms at the same time a molding along the new edge of the slab. A molding portion of the wheel might be arranged at each side of the through-cutting portion 9. The part 9 is, in fact, a coping-wheel, acting in the same way as in the coping-machine described in my application Serial No. 230,863, filed October 31, 1904. Besides the decorative effect of the molding portion of the wheel, which makes, at an inappreciable increase of cost, a product of higher selling value, this molding portion of the wheel strengthens the coping portion 9, permitting the latter to be made very thin and permitting an increase in the speed of rotation over that which would be possible with such a thin wheel without the reinforcing molding portion. Ordinarily, the bed A will be covered with a coating 10 of plaster-of-paris or the like, so as to avoid injury to the table or to the coping portion 9 of the wheel where the latter passes through the stone, or the coping portion 9 of the wheel may pass not entirely through the stone, leaving a thin web at the bottom to be afterward broken off.

Though I have described with great particularity of detail certain apparatus embodying my invention, yet it is not to be understood therefrom that the invention is limited to the specific embodiments disclosed.

Various modifications thereof in detail and in the arrangement and combination of the parts may be made by those skilled in the art without departure from the invention.

What I claim is—

1. A stone-molding machine including in combination a roughing-out and a molding wheel, and a single carriage carrying said wheels and adjustable laterally.

2. A stone-molding machine including in combination a roughing-out and a molding wheel, a laterally-adjustable carriage carrying both said wheels, and a vertically-adjustable frame carrying said carriage.

3. A stone-molding machine including in combination a roughing-out wheel of coarse carborundum adapted to cut the stone to approximately the shape of the desired mold, and a molding-wheel of fine carborundum adapted to cut the stone to the final shape, one of said wheels being adjustable relatively to the other, and both of said wheels being adjustable relatively to the work.

4. A stone-molding machine including in combination a roughing-out wheel of coarse carborundum adapted to cut the stone to approximately the shape of the desired mold, and a molding-wheel of fine carborundum adapted to cut the stone to the final shape, one of said wheels being adjustable relatively to the other, a bed for carrying the work, and means for adjusting the position of both wheels relatively to the bed.

5. A stone-molding machine including in combination a roughing-out wheel of coarse carborundum, a molding-wheel of fine carborundum, a feed-table, said wheels being arranged to operate successively on a slab carried on said feed-table, a driving-shaft K, connecting means between said shaft and said wheels for driving the latter at a high rate of speed, and connections including clutches operated from the front of the machine for driving said feed-table at different slow rates of speed from said shaft K.

6. A stone-molding machine including in combination a rotating molding-wheel, a frame F carrying said wheel, rotating nuts $f$ carried by said frame, fixed screw-shafts $g$ threaded between said nuts, shafts $j$ at the sides of the frame carrying pinions $h$ in engagement with said nuts $f$, a common horizontal shaft $k$ operating said shafts $j$, and a shaft $l$ projecting through the face of the frame and provided with a hand-wheel $m$.

7. A stone-molding machine including in combination a rotating molding-wheel, a carriage E carrying said wheel and arranged to slide backward and forward transversely of the feed of the stone, a relatively fixed nut $p$, a screw-shaft $q$ connected to the carriage E, a shaft $s$ operating said nut $p$ and projecting through the front of the machine, and a hand-wheel $t$ for said shaft.

8. A stone-molding machine including in combination a pair of rotating molding-wheels C and D having shafts $v$ and $u$ respectively projecting from said wheels at the front of the carriage to and beyond the rear of the carriage, pulleys M and N on the rear ends of said shafts, and bearings in said carriage for the opposite ends of each of said shafts, the shaft $u$ being shorter than the shaft $v$, and the rear end of the carriage being correspondingly offset so that the pulleys M and N are not in line with each other.

9. A stone-molding machine including in combination a roughing-out wheel C, a molding-wheel D, a carriage E, a shaft $u$ for the molding-wheel mounted fixedly in bearings in said carriage, bearing-blocks J vertically movable in said carriage, a shaft $v$ for the roughing-out wheel mounted in said bearing-blocks, and means for adjusting said bearing-blocks vertically to determine the position of the roughing-out wheel relatively to the molding-wheel.

In witness whereof I have hereunto signed my name in the presence of two subscribing witnesses.

JOHN ROYDEN PEIRCE.

Witnesses:
DOMINGO A. USINA,
THEODORE T. SNELL.